United States Patent
Matsushita et al.

(10) Patent No.: US 11,241,755 B2
(45) Date of Patent: Feb. 8, 2022

(54) FRICTION STIR WELDING METHOD AND APPARATUS FOR STRUCTURAL STEEL

(71) Applicant: JFE Steel Corporation, Tokyo (JP)

(72) Inventors: Muneo Matsushita, Tokyo (JP); Rinsei Ikeda, Tokyo (JP); Koichi Taniguchi, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 229 days.

(21) Appl. No.: 16/089,217

(22) PCT Filed: Mar. 22, 2017

(86) PCT No.: PCT/JP2017/011286
§ 371 (c)(1),
(2) Date: Sep. 27, 2018

(87) PCT Pub. No.: WO2017/169991
PCT Pub. Date: Oct. 5, 2017

(65) Prior Publication Data
US 2020/0306871 A1    Oct. 1, 2020

(30) Foreign Application Priority Data
Mar. 31, 2016 (JP) .............................. JP2016-073233

(51) Int. Cl.
*B23K 20/12* (2006.01)
*B23K 20/24* (2006.01)
(Continued)

(52) U.S. Cl.
CPC ...... *B23K 20/1235* (2013.01); *B23K 20/1255* (2013.01); *B23K 20/24* (2013.01); *B23K 2101/18* (2018.08); *B23K 2103/04* (2018.08)

(58) Field of Classification Search
CPC ............ B23K 2101/18; B23K 2103/04; B23K 20/122–128
(Continued)

(56) References Cited

U.S. PATENT DOCUMENTS 4,811,887 A    3/1989  King et al.
5,460,317 A   10/1995  Thomas et al.
(Continued)

FOREIGN PATENT DOCUMENTS

CA    2409489 A1 * 11/2001  ......... B23K 20/1255
CN    1313238 C     5/2007
(Continued)

OTHER PUBLICATIONS

International Search Report and Written Opinion for International Application No. PCT/JP2017/011286, dated May 16, 2016—9 pages.

(Continued)

*Primary Examiner* — Kiley S Stoner
(74) *Attorney, Agent, or Firm* — RatnerPrestia (57) ABSTRACT

An object is to provide a friction stir welding method and apparatus that provide sufficient strength and good welding workability by advantageously eliminating plastic flow deficiency generated as a result of insufficient heating of workpieces.
In friction stir welding for steel sheets (3,3) as workpieces, a pair of facing rotary tools (1,15) are inserted into a non-welded part from both one surface side and the other surface side of the steel sheets (3,3), the rotary tools move in a welding direction while rotating, and in addition, a preheating process for heating steel sheets (3,3) is performed by heating means (5) provided in front of the rotary tools (1,15). The configuration of the pair of facing rotary tools (Continued)

(1,15) and the surface temperature, area, position, and so forth of a heated region in the preheating process are strictly controlled.

9 Claims, 3 Drawing Sheets

(51) Int. Cl.
*B23K 101/18* (2006.01)
*B23K 103/04* (2006.01)

(58) Field of Classification Search
USPC .............................. 228/112.1–114.5, 2.1–2.3
See application file for complete search history.

(56) References Cited

U.S. PATENT DOCUMENTS

| | | | |
|---|---|---|---|
| 9,061,370 B2 | 6/2015 | Nelson et al. | |
| 9,849,541 B2* | 12/2017 | Werz | B23K 20/1255 |
| 2004/0020970 A1* | 2/2004 | Palm | B23K 26/0643 |
| | | | 228/112.1 |
| 2004/0046003 A1* | 3/2004 | Vyas | B23K 20/123 |
| | | | 228/112.1 |
| 2004/0144830 A1* | 7/2004 | Murakami | B23K 20/1255 |
| | | | 228/112.1 |
| 2005/0029330 A1* | 2/2005 | Kohn | B23K 20/123 |
| | | | 228/112.1 |
| 2006/0086707 A1* | 4/2006 | Kou | B23K 20/1235 |
| | | | 219/137 R |
| 2010/0136369 A1* | 6/2010 | Ayer | C22C 38/001 |
| | | | 428/683 |
| 2010/0258612 A1* | 10/2010 | Kolbeck | B23K 20/125 |
| | | | 228/2.1 |
| 2011/0104515 A1* | 5/2011 | Kou | C22C 23/02 |
| | | | 428/649 |
| 2011/0284527 A1* | 11/2011 | Holverson | B23K 9/235 |
| | | | 219/660 |
| 2016/0105935 A1* | 4/2016 | Jones | B23K 10/00 |
| | | | 219/601 |
| 2016/0228981 A1* | 8/2016 | Matsushita | B23K 20/1235 |
| 2016/0354860 A1* | 12/2016 | Boettcher | B23K 20/2336 |
| 2017/0157720 A1 | 6/2017 | Sato | |
| 2017/0209957 A1* | 7/2017 | Sato | B23K 20/2336 |
| 2018/0043466 A1* | 2/2018 | Matsushita | B23K 20/1235 |

FOREIGN PATENT DOCUMENTS

| | | | | |
|---|---|---|---|---|
| CN | 102481659 A | | 5/2012 | |
| CN | 102601516 A | | 7/2012 | |
| CN | 103008896 A | | 4/2013 | |
| CN | 104551379 A | | 4/2015 | |
| EP | 1514632 A1 | | 3/2005 | |
| EP | 2474382 A1 | | 7/2012 | |
| EP | 3053697 A1 | | 8/2016 | |
| JP | 62183979 A | | 8/1987 | |
| JP | 07505090 A | | 6/1995 | |
| JP | 3261433 B2 | | 3/2002 | |
| JP | 2003094175 A | | 4/2003 | |
| JP | 2003532542 A | | 11/2003 | |
| JP | 2003532543 A | | 11/2003 | |
| JP | 2005288474 A | | 10/2005 | |
| JP | 4838385 B2 | | 12/2011 | |
| WO | 2011024320 A1 | | 3/2011 | |
| WO | WO-2012086488 A1 * | | 6/2012 | ......... B23K 20/1255 |
| WO | 2015045299 A1 | | 4/2015 | |
| WO | 2015045420 A1 | | 4/2015 | |
| WO | WO-2015045299 A1 * | | 4/2015 | ......... B23K 20/1235 |
| WO | WO-2015045420 A1 * | | 4/2015 | ......... B23K 20/1235 |
| WO | WO-2015045421 A * | | 4/2015 | ........... B23K 20/227 |
| WO | 2015198910 A1 | | 12/2015 | |
| WO | 2016147668 A1 | | 9/2016 | |
| WO | WO-2016147668 A1 * | | 9/2016 | ......... B23K 20/1225 |

OTHER PUBLICATIONS

Chinese Office Action with Search Report for Chinese Application No. 201780021133.9, dated Dec. 1, 2020, 7 pages.
Extended European Search Report for European Application No. 17 774 532.0, dated May 9, 2019, 8 pages.
Korean Office Action for Korean Application No. 10-2018-7028083, dated Aug. 19, 2019, with Concise Statement of Relevance of Office Action, 6 pages.
Chinese Office Action with Search Report for Chinese Application No. 201780021133.9, dated Apr. 27, 2020, 11 pages.

* cited by examiner

(1) PIN LENGTH 1.4 mm (2) PIN LENGTH 1.2 mm (3) PIN LENGTH 0.7 mm (4) PIN LENGTH 0.2 mm

FRICTION STIR WELDING METHOD AND APPARATUS FOR STRUCTURAL STEEL

CROSS REFERENCE TO RELATED APPLICATIONS

This is the U.S. National Phase application of PCT/JP2017/011286, filed Mar. 22, 2017, which claims priority to Japanese Patent Application No. 2016-073233, filed Mar. 31, 2016 the disclosures of these applications being incorporated herein by reference in their entireties for all purposes.

FIELD OF THE INVENTION

The present invention relates to a friction stir welding method for welding workpieces without the addition of a filler metal, the method including:
inserting a rotary tool (hereinafter, also merely referred to as "tool") into a non-welded part of the workpieces;
moving the rotary tool while rotating the rotary tool; and
softening the workpieces by frictional heat generated between the rotary tool and the workpieces.
The method uses plastic flow generated by stirring the softened portion with the rotary tool.
The present invention also relates to an apparatus that can provide the method.

BACKGROUND OF THE INVENTION

As a friction welding method, Patent Literature 1 discloses a technique for welding metal materials (workpieces), in which, by rotating at least one of a pair of metal materials, the metal materials are softened by frictional heat generated there, and the softened portion is stirred to produce plastic flow, thereby the metal materials can be welded.

Since this technique involves rotating metal materials to be welded, there are limitations on the shape and the dimensions of metal materials to be welded.

Patent Literature 2 discloses a method for continuously welding workpieces in the longitudinal direction thereof using heat generated between the workpieces and a tool and plastic flow caused by inserting the tool into a non-welded part of the workpieces and moving the tool while rotating the tool. The tool is made of a material substantially harder than the material of the workpieces.

The friction welding method disclosed in Patent Literature 1 involves welding workpieces with frictional heat generated between the workpieces while rotating the workpieces. The friction stir welding method disclosed in Patent Literature 2 can weld the workpieces by moving and rotating the tool while the workpieces are fixed. Therefore, this method has an advantage of continuous solid-state welding of workpieces in the longitudinal direction, even if the workpieces are substantially infinitely long in the welding direction. Since this method provides solid-state welding using plastic flow of metal produced by frictional generated heat between the rotary tool and the workpieces, the workpieces can be welded together without the need to melt the non-welded part. Furthermore, this method has many advantages of, for example, less deformation after welding because of heating temperature by heating means being low, fewer welded-part defects because of the non-welded part staying not molten, no necessity for a filler metal and so forth.

In this specification, the term "non-welded part" refers to an abutting portion, for example, between steel sheets that merely abut each other and are not welded. The term "welded part" refers to a portion welded and integrated by plastic flow.

The friction stir welding method has a wide range of applications in the fields pertaining to aircraft, watercraft, railed vehicles, and motor vehicles, and other fields as a method for welding low-melting-point metal materials typified by aluminum alloys and magnesium alloys. The reason for this is that an arc welding process known in the art is unlikely to provide the welded part of such low-melting-point metal materials with satisfactory properties, and the use of the friction stir welding method improves productivity and the quality of the welded part.

The use of the friction stir welding method for structural steel mainly used as a material for structures such as buildings, watercraft, heavy machines, pipelines, and motor vehicles avoids solidification cracking and hydrogen cracking, which are problematic in fusion welding known in the art, and also suppresses microstructural changes in steel, which is expected to improve joint performance. The friction stir welding method also has an anticipated advantage of no necessity for a preparation step, such as diffusion welding, because stirring the joint interface with the rotary tool creates clean surfaces and enables contact between the clean surfaces. Consequently, the use of the friction stir welding method for structural steel has many anticipated advantages. However, challenges associated with welding workability, such as suppression of defect generation during welding and an increase in welding speed remain, which hinders the friction stir welding method from being used widely for structural steel compared with low-melting-point metal materials.

In friction stir welding for structural steel, high abrasion resistance materials such as polycrystal boron nitride (PCBN) and silicon nitride ($Si_3N_4$) are currently used for rotary tools as described in Patent Literature 3 and Patent Literature 4. However, since these ceramics are brittle, there are strict limitations on the thickness of steel sheets to be welded and the conditions for processing the steel sheets in order to prevent breakage of the rotary tool.

Patent Literatures 5 to 7 disclose welding methods using additional heating means in addition to frictional heat generated between a rotary tool and workpieces in order to improve welding workability.

Patent Literature 5 discloses a friction stir welding method involving heating means using an induction heating device, which heats workpieces before and after welding to increase the welding speed and prevent or reduce cracking in the welded part.

Patent Literature 6 discloses a friction stir welding apparatus having heating means using a laser device, which partially heats workpieces just before welding to reduce changes in microstructure around the region heated by preheating and to increase the welding speed.

Patent Literature 7 discloses a friction stir welding apparatus having heating means using a laser device, which partially heats workpieces just before welding. When heating is performed, the surface temperature, depth, and so forth of the heated region of the workpieces are strictly controlled. Thus, plastic flow deficiency as a result of insufficient heating of the workpieces is eliminated, sufficient strength is given, and the welding workability can be improved.

Patent Literatures 8 and 9 disclose both-side friction stir welding methods and apparatuses in which rotary tools are provided on upper and lower sides one by one, and the rotary tools are disposed to vertically face the front surface side and the back surface side of overlapping portions of two metal sheets. In the both-side friction stir welding methods and apparatuses, workpieces are pressed from the upper and lower sides while the rotary tools are rotated, and the workpieces are welded while the rotary tools are moved in the welding direction. Accordingly, welding defects are suppressed and the welding strength can be increased. Further, by increasing the life of rotary tools, the economy of the rotary tools can be improved.

In friction stir welding, plastic flow is produced by softening workpieces with frictional heat and by stirring the workpieces with a rotary tool. In the case where the workpieces are structural steel, when the rotary tool stirs the workpieces, a large load is applied to a pin of the rotary tool. This phenomenon largely affects the durability and life of the rotary tool, and is a major factor of limiting the welding workability. The method for adding the heating means in addition to the frictional heat described in Patent Literatures 5 to 7 may be effective to address the above-described problems. However, in the method described in Patent Literatures 5 to 7, the side provided with the heating means and the side provided with the rotary tool are the same side between the front surface side and the back surface side of the workpieces. The heating source exists only on one surface side (for example, front surface side). Thus, the temperature is lower on the side opposite to the side provided with the heating means and the rotary tool, that is, the back surface side, compared with the temperature on the front surface side. A temperature difference is generated in the thickness direction of the workpieces from the front surface side to the back surface side. The strength of the metal sheets used as the workpieces decreases as the temperature increases. Hence, the load on the rotary tool during friction stir welding may decrease as the temperature increases. Thus, the load applied to the distal end of the pin of the rotary tool may be decreased by eliminating the temperature difference that is generated in the thickness direction of the workpieces. However, Patent Literatures 5 to 7 do not consider at all the decrease in the load on the rotary tool by eliminating the temperature difference in the thickness direction of the workpieces.

For the method for eliminating the temperature difference in the thickness direction of the workpieces in friction stir welding, the both-side friction stir welding methods disclosed in Patent Literatures 8 and 9 may be effective. However, the welding methods do not consider at all the decrease in the load on the rotary tool, the improvement in the welding workability, and the increase in the life of the rotary tool by the preheating process for heating the workpieces using the heating means in front of the rotary tool.

PATENT LITERATURE

PTL 1: Japanese Unexamined Patent Application Publication No. 62-183979
PTL 2: Japanese Unexamined Patent Application Publication (Translation of PCT Application) No. 7-505090
PTL 3: Japanese Unexamined Patent Application Publication (Translation of PCT Application) No. 2003-532542
PTL 4: Japanese Unexamined Patent Application Publication (Translation of PCT Application) No. 2003-532543
PTL 5: Japanese Unexamined Patent Application Publication No. 2003-94175
PTL 6: Japanese Unexamined Patent Application Publication No. 2005-288474
PTL 7: International Publication No. WO2015/045299 A1
PTL 8: Japanese Patent No. 3261433
PTL 9: Japanese Patent No. 4838385

SUMMARY OF THE INVENTION

Aspects of the present invention have been developed in light of the above-mentioned circumstances. An object according to aspects of the present invention is to obtain a welded part having sufficient strength and improve welding workability by eliminating plastic flow deficiency generated as a result of insufficient heating of workpieces during friction stir welding for structural steel. To attain the above-described object, in particular, aspects of the present invention therefore provide a friction stir welding method and a friction stir welding apparatus capable of performing a preheating process under particularly strictly specified conditions.

The inventors of the present invention have obtained the following findings as a result of diligent studies to solve the above-mentioned problems.

a) In ordinary friction stir welding, a heat source needed for welding is only frictional heat generated between a rotary tool and workpieces. In the case of friction stir welding for structural steel, the heat amount sufficient to soften structural steel used as workpieces cannot be ensured. As a result, sufficient plastic flow is not obtained in the welded part, which may result in deterioration of welding workability, such as low welding speed and generation of welding defects.

To avoid the deterioration of welding workability, the preheating process before friction stir welding is considered to be effective.

b) However, when the side provided with heating means for the preheating process and the side provided with the rotary tool are the same side between the front surface side and the back surface side of the workpieces, the heating source exists only on the same surface side (for example, front surface side). Thus, the temperature is lower on the back surface side than the temperature on the front surface side. A temperature difference is generated in the thickness direction of the workpieces from the front surface side to the back surface side. Since the strength of the metal sheet used as the workpiece decreases as the temperature increases, the load on the rotary tool during friction stir welding decreases as the temperature increases. By eliminating the temperature difference generated in the thickness direction of the workpiece, the load applied to the distal end of the pin of the rotary tool may be further effectively decreased.

The inventors have carried out various studies on the conditions of the preheating process before friction stir welding.

Consequently, c) To eliminate the temperature difference in the thickness direction from the front surface side to the back surface side of the workpiece, it has been found effective to arrange rotary tools on one surface side and the other surface side of the workpiece to be treated with the preheating process, and to provide a mechanism that provides friction stir welding of heating the workpiece with frictional heat from both the one surface side and the other surface side.

d) An excessive heat amount of preheat in the welding described above including the preheating process before the friction stir welding causes a problem associated with changes in microstructure around the heated region. In particular, in the case of high-tensile steel sheets reinforced by the martensite structure, even if temperature around the heated region is equal to or lower than the ferrite-austenite transformation temperature still the martensite is tempered, which causes softening there and thus significantly reduces the strength of the welded part.

Therefore, the inventors have studied preheating processing conditions before friction stir welding.

As a result, e) By the use of a heat source with high energy density, such as a laser, the surface temperature, area, and position of the heated region in the preheating process are strictly controlled and also the temperature of the heated region in the thickness direction is properly controlled as necessary. The inventors have found that this can improve welding workability without causing deterioration of the properties (for example, strength) of the welded part.

f) It has been found that, during heating of the workpiece, the workability can be improved by adjusting the amount of heat generated by friction dependent on the kinetic friction coefficient between the material used on the surface of the rotary tool and the workpiece.

g) Ordinary friction stir welding has a problem in that microstructure control by heat history management as in the rolling process during the production of steel cannot be used because the welded part is naturally cooled after completion of welding. However, the inventors have found that properties of the welded part can be further improved by subjecting the welded part to a combined heating and cooling process just after completion of welding.

Aspects of the present invention are based on the above-mentioned findings.

Aspects of the present invention are as described below.

1. A friction stir welding method for structural steel is provided, the method welding steel sheets used as workpieces together by moving a rotary tool in a welding direction while rotating the rotary tool in a non-welded part of the steel sheets, and thus by producing plastic flow as a result of that the steel sheets are softened by frictional heat generated between the rotary tool and the steel sheets and that the softened portion is stirred with the rotary tool, the rotary tool including a shoulder and a pin disposed on the shoulder and sharing a rotation axis with the shoulder, at least the shoulder and the pin being made of a material harder than the steel sheets (used as workpieces), the method including:

arranging the rotary tool on each of one surface side and the other surface side of the steel sheets so as to face one another;

holding the steel sheets using a holding device, causing each of the shoulders of the facing rotary tools to press the one surface side and the other surface side of the steel sheets, inserting each of the pins of the facing rotary tools into the non-welded part of the steel sheets from the one surface side and the other surface side, and moving the rotary tools in the welding direction while rotating the rotary tools; and heating at least one of the steel sheets using heating means provided in front of the rotary tool on the one surface side that moves in the welding direction, in which, when a region of a surface of the steel sheet whose surface temperature $T_S$(° C.) is increased to $T_S \geq 0.8 \times T_{A1}$ ($T_{A1}$ is described in Formula (1) below) by the heating is defined as a heated region, a minimum distance between the rotary tool and the heated region on the surface of the steel sheet is equal to or smaller than a diameter of the shoulder of the rotary tool, and an area of the heated region on the surface of the steel sheet is equal to or smaller than an area of a maximum diameter part of the pin of the rotary tool, $$T_{A1}(° C.)=723-10.7[\% Mn]-16.9[\% Ni]+29.1[\% Si]+16.9[\% Cr]+290[\% As]+6.38[\% W] \quad (1),$$

where [% M] represents a content (mass %) of an M element in the steel sheet used as the workpiece, and if the M element is not contained, [% M] is 0.

2. In the friction stir welding method for structural steel according to aspect 1, pin lengths of the pins of both the facing rotary tools are the same.

3. In the friction stir welding method for structural steel according to aspect 1, for pin lengths of the pins of both the facing rotary tools, the pin length of the pin of the rotary tool on the one surface side is smaller than the pin length of the pin of the rotary tool on the other surface side.

4. In the friction stir welding method for structural steel according to any one of aspects 1 to 3, the method performs friction stir welding by tilting axes of both the facing rotary tools in a direction in which the pins lead in a travel direction of the rotary tools, and by moving the rotary tools in the welding direction while rotating the rotary tools.

5. In the friction stir welding method for structural steel according to any one of aspects 1 to 4, a rotation direction of the rotary tool on the one surface side is opposite to a rotation direction of the rotary tool on the other surface side.

6. In the friction stir welding method for structural steel according to any one of aspects 1 to 5, when a depth of a region that extends from the surface of the steel sheet in the heated region in a thickness direction and has a temperature $T_D$(° C.) satisfying $T_D \geq 0.8 \times T_{A1}$ ($T_{A1}$ is described in Formula (1) below) is defined as a depth D of the heated region, the depth D of the heated region is 100% of a thickness t of the steel sheet, $$T_{A1}(° C.)=723-10.7[\% Mn]-16.9[\% Ni]+29.1[\% Si]+16.9[\% Cr]+290[\% As]+6.38[\% W] \quad (1),$$

where [% M] represents a content (mass %) of an M element in the steel sheet used as the workpiece, and if the M element is not contained, [% M] is 0.

7. In the friction stir welding method for structural steel according to any one of aspects 1 to 6, the heating means is a laser heating device.

8. The friction stir welding method for structural steel according to any one of aspects 1 to 7, further includes providing rear heating means behind the rotary tool that moves in the welding direction, and heating a welded part of the steel sheets with the rear heating means.

9. The friction stir welding method for structural steel according to aspect 8, further includes providing cooling means behind the rotary tool and behind the rear heating means, and cooling the welded part of the steel sheets with the cooling means.

10. The friction stir welding method for structural steel according to any one of aspects 1 to 7, further includes providing cooling means behind the rotary tool that moves in the welding direction, and cooling a welded part of the steel sheets with the cooling means.

11. The friction stir welding method for structural steel according to aspect 9 or 10, further includes providing rear reheating means behind the rotary tool that moves in the welding direction and behind the cooling means, and reheating the welded part of the steel sheets with the rear reheating means.

12. In the friction stir welding method for structural steel according to any one of aspects 1 to 11, surfaces of the rotary tools are formed of a material having a kinetic friction coefficient with respect to the steel sheets being larger than 0.6.

13. A friction stir welding apparatus that welds a non-welded part of steel sheets used as workpieces, includes:
a holding device that holds the steel sheets to be welded;
a rotary tool that includes a shoulder and a pin disposed on the shoulder and sharing a rotation axis with the shoulder, at least the shoulder and the pin being made of a material harder than the steel sheets, the rotary tool being arranged on each of one surface side and the other surface side of the steel sheets so as to face one another, the rotary tools being movable in a welding direction while rotating in a state in which each of the shoulders of the facing rotary tools presses the one surface side and the other surface side of the steel sheets and each of the pins of the facing rotary tools is inserted into the non-welded part of the steel sheets;
heating means for heating at least one of the steel sheets, provided in front of the rotary tool on the one surface side in the welding direction; and
control means for controlling the rotary tools and the heating means to provide condition 1 as follows,
(condition 1)
when a region of a surface of the steel sheet whose surface temperature $T_S$(° C.) is increased to
$T_S \geq 0.8 \times T_{A1}$ ($T_{A1}$ is described in Formula (1) below) by the heating using the heating means is defined as a heated region,
a minimum distance between the rotary tool and the heated region on the surface of the steel sheet is equal to or smaller than a diameter of the shoulder of the rotary tool, and
an area of the heated region on the surface of the steel sheet is equal to or smaller than an area of a maximum diameter part of the pin of the rotary tool, $$T_{A1}(° C.)=723-10.7[\% Mn]-16.9[\% Ni]+29.1[\% Si]+16.9[\% Cr]+290[\% As]+6.38[\% W] \quad (1),$$

where [% M] represents a content (mass %) of an M element in the steel sheet used as the workpiece, and if the M element is not contained, [% M] is 0.

14. In the friction stir welding apparatus for structural steel according to aspect 13, both the facing rotary tools include a shoulder and a pin disposed on the shoulder and sharing a rotation axis with the shoulder, and pin lengths of the pins of both the facing rotary tools are the same.

15. In the friction stir welding apparatus for structural steel according to aspect 13, both the facing rotary tools include a shoulder and a pin disposed on the shoulder and sharing a rotation axis with the shoulder, and for pin lengths of the pins of both the facing rotary tools, the pin length of the pin of the rotary tool on the one surface side is smaller than the pin length of the pin of the rotary tool on the other surface side.

16. In the friction stir welding apparatus for structural steel according to any one of aspects 13 to 15, axes of both the facing rotary tools are tilted in a direction in which the pins lead in a travel direction of the rotary tools.

17. In the friction stir welding apparatus for structural steel according to any one of aspects 13 to 16, a rotation direction of the rotary tool on the one surface side is opposite to a rotation direction of the rotary tool on the other surface side.

18. In the friction stir welding apparatus for structural steel according to any one of aspects 13 to 17, the control means controls the rotary tools and the heating means to provide condition 2 in addition to the condition 1 as follows,
(condition 2)
when a depth of a region that extends from the surface of the steel sheet in the heated region in a thickness direction and has a temperature $T_D$(° C.) satisfying $T_D \geq 0.8 \times T_{A1}$ ($T_{A1}$ is described in Formula (1) below) is defined as a depth D of the heated region, the depth D of the heated region is 100% of a thickness t of the steel sheet, $$T_{A1}(° C.)=723-10.7[\% Mn]-16.9[\% Ni]+29.1[\% Si]+16.9[\% Cr]+290[\% As]+6.38[\% W] \quad (1),$$

where [% M] represents a content (mass %) of an M element in the steel sheet used as the workpiece, and if the M element is not contained, [% M] is 0.

19. In the friction stir welding apparatus for structural steel according to any one of aspects 13 to 18, the heating means is a laser heating device.

20. The friction stir welding apparatus for structural steel according to any one of aspects 13 to 19, further includes rear heating means for heating a welded part of the steel sheets, provided behind the rotary tool that moves in the welding direction.

21. The friction stir welding apparatus for structural steel according to aspect 20, further includes cooling means for cooling the welded part of the steel sheets, provided behind the rotary tool and behind the rear heating means.

22. The friction stir welding apparatus for structural steel according to any one of aspects 13 to 19, further includes cooling means for cooling a welded part of the steel sheets, provided behind the rotary tool that moves in the welding direction.

23. The friction stir welding apparatus for structural steel according to aspect 21 or 22, further includes rear reheating means for reheating the welded part of the steel sheets, provided behind the rotary tool that moves in the welding direction and behind the cooling means.

24. In the friction stir welding apparatus for structural steel according to any one of aspects 13 to 23, surfaces of the rotary tools are formed of a material having a kinetic friction coefficient with respect to the steel sheets being larger than 0.6.

Aspects of the present invention improve welding workability during friction stir welding for structural steel by eliminating plastic flow deficiency generated as a result of insufficient heating of workpieces in the sheet thickness direction, the plastic flow deficiency having been a concern for years. The invention also reduces changes in microstructure to provide high joint strength in the welded part.

DETAILED DESCRIPTION OF EMBODIMENTS OF THE INVENTION

Embodiments of the present invention will be described below in detail.

Figure 1:
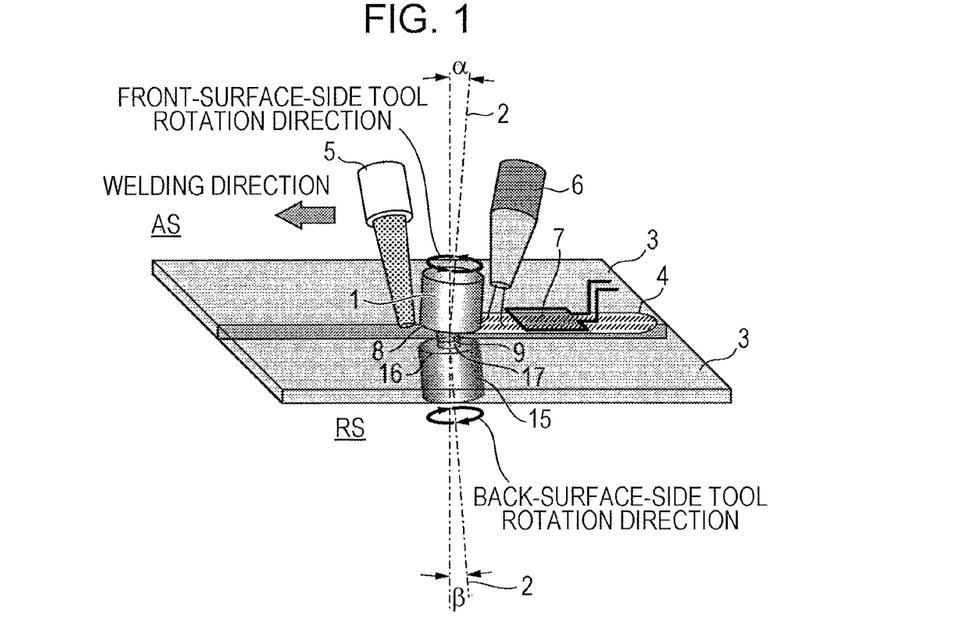
FIG. 1 is a schematic view illustrating a friction stir welding method according to aspects of the present invention.

Aspects of the present invention provide a friction stir welding method and a friction stir welding apparatus for structural steel. As illustrated in FIG. 1, the method and apparatus include a preheating process for heating workpieces (steel sheets) by heating means provided in front of a rotary tool, and a friction stir process using the rotary tool behind the heating means. The rotary tool is arranged on each of one surface (front surface) side and the other surface (back surface) side of the steel sheets to face one another. The rotary tools weld the steel sheets by producing plastic flow as a result of that the steel sheets are softened by frictional heat generated between the steel sheets and the rotary tools during rotation and that the softened portion is stirred with the rotary tools.

In FIG. 1, reference signs 1 and 15 denote rotary tools, 2 denotes a rotation axis, 3 denotes a steel sheet, 4 denotes a welded part, 5 denotes heating means, 6 denotes cooling means, 7 denotes rear reheating means, 8 and 16 denote shoulders of the rotary tools, 9 and 17 denote pins of the rotary tools, and α and β denote tilt angles of the rotary tools. It is to be noted that "AS" and "RS" respectively denote advancing side and retreating side.

The advancing side is defined as a side that the rotation direction of the rotary tool (tool rotation direction) on the front surface side provided with the heating means agrees with the welding direction. The retreating side is defined as a side that the tool rotation direction on the front surface side opposes the welding direction.

According to aspects of the present invention, the steel sheets (workpieces) 3, 3 are held by a holding device (not illustrated) from the front and back surface sides, the pins of the facing rotary tools are inserted into a non-welded part from the front surface side and the back surface side of the non-welded part of the workpieces, the shoulders of the facing rotary tools are pressed to the front surface side and the back surface side of the workpieces, and thus welding is performed. A clearance δ may be appropriately provided between the distal ends of the pins of the facing rotary tools so that application of friction by the shoulders and stirring by the pins are properly performed and welding is soundly performed. To decrease the load on the rotary tools due to deformation resistance of the material during stirring, the clearance δ is effectively 0.1 mm or larger. If the clearance δ is too large, a portion that is not properly stirred by the pins becomes defective. The clearance δ is preferably 0.3 mm or smaller.

The facing rotary tools include a shoulder and a pin. The pin is arranged on the shoulder and shares the rotation axis with the shoulder. At least the shoulder and the pin are formed of a material harder than the material of the steel sheets used as workpieces. One of the rotary tools on the one surface side provided with the heating means of the facing rotary tools may include the shoulder but may not include the pin. In this case, the shoulder of the rotary tool on the one surface side, and the shoulder and the pin of the rotary tool on the other surface side may be formed of a material harder than the material of steel sheets used as workpieces.

Figure 4:
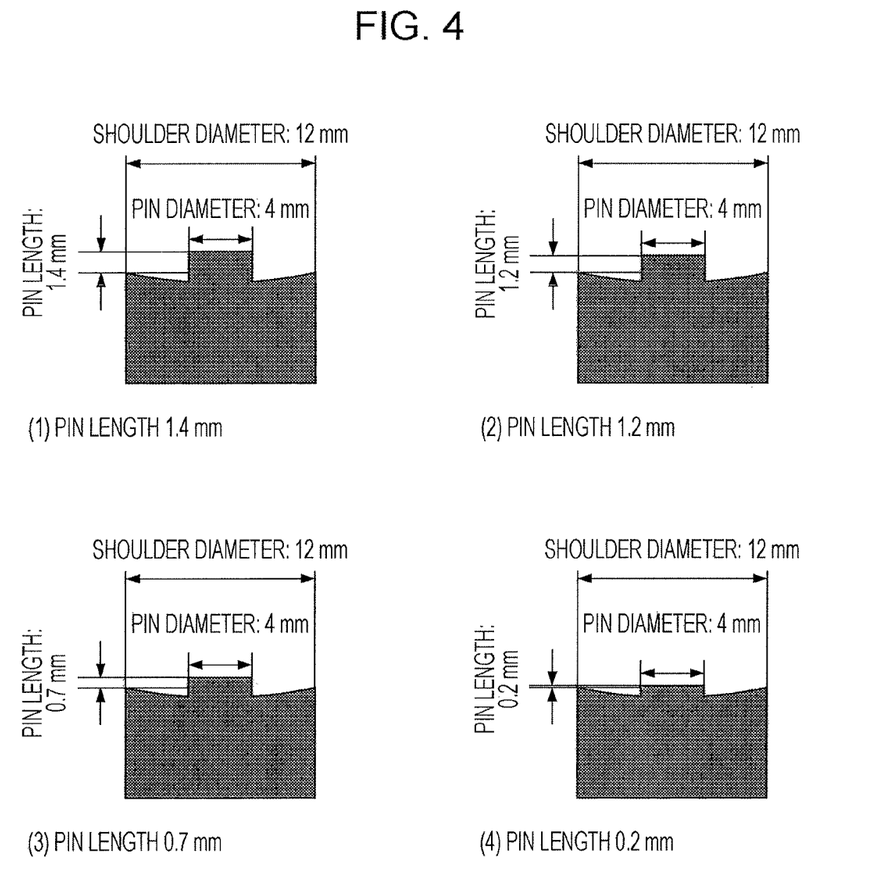
FIG. 4 illustrates the cross-sectional dimensions of rotary tools used in Examples.

As illustrated in FIG. 4, the rotary tool has a shape in which the pin having a substantially columnar shape and having a diameter smaller than that of the shoulder is provided on the shoulder having a substantially columnar shape. As illustrated in FIG. 4, the surface of the shoulder may also be tapered.

In conventional friction stir welding, a rotary tool in which at least a shoulder and a pin thereof are formed of a material harder than the material of steel sheets used as workpieces is arranged only on the one surface side of the steel sheets, the pin is inserted into a non-welded part of the steel sheets, and welding is performed. Hence the length in the axial direction of the pin (pin length) is required to be equivalent to the thickness of the workpieces. However, as the pin length is larger, the load to be applied to the distal end of the pin increases. Therefore, to improve welding workability and to increase the life of the rotary tool, the pin length is preferably smaller.

In accordance with aspects of this invention, when the pin lengths of both the facing rotary tools are the same, the pin lengths can be about a half of the thickness of the workpieces. The load to be applied to each rotary tool can be decreased as compared with a case where the pin of the rotary tool is inserted only from the one surface side to perform welding.

When one of the pin lengths of the facing rotary tools, the pin length of the rotary tool on the side provided with the heating means is smaller than the pin length of the tool on the opposite side, the load can be decreased owing to the smaller pin length of the rotary tool on the side provided with the heating means. In addition, sufficient heat can be supplied by the heating means to the welded part around the distal end of the rotary tool on the side opposite to the side provided with the heating means. Thus, the load on the tool can be likewise decreased.

By tilting the axes of the facing rotary tools in a direction in which the pins lead in the travel direction of the rotary tools (in other words, tilting the rotary tools so that the distal ends of the pins are located on the front side in the travel direction of the rotary tools with respect to the proximal ends of the pins), the load to be applied to the tools can become component forces compressed in the axial direction. At least the shoulders and the pins of the tools are required to be formed of a material harder than the steel sheets, and therefore, a material having low toughness such as ceramics is used in many cases. If a force is applied to the pins in a bending direction, the force may be concentrated at a local portion, and the pins may be broken. By tilting the axes of the rotary tools, the load on the tools is received as component forces compressed in the axial direction. The force in the bending direction can be decreased, and damage to the tools can be avoided. An example of the tilt angle of each of the pins is in a range from 1° to 5°. The tilt angle of the pin represents one of angles defined between the central axis of the rotary tool and the vertical line and having an acute angle.

Since the rotation direction of a rotary tool on the one surface side is opposite to the rotation direction of a rotary tool on the other surface side facing to the above one, rotation torques to be applied to the workpieces by the rotary tools can be canceled with one another. Thereby, as compared with the conventional friction stir welding method for welding workpieces while pressing the rotary tool from the one surface side, the structure of the jig for constraining the workpieces can be simplified.

In the friction stir welding method and apparatus according to aspects of the present invention, the preheating process for heating a steel sheet with the heating means provided in front of the rotary tool that moves in the welding direction is important. The conditions of the preheating process will be described below with reference to FIG. 2.

Figure 2:
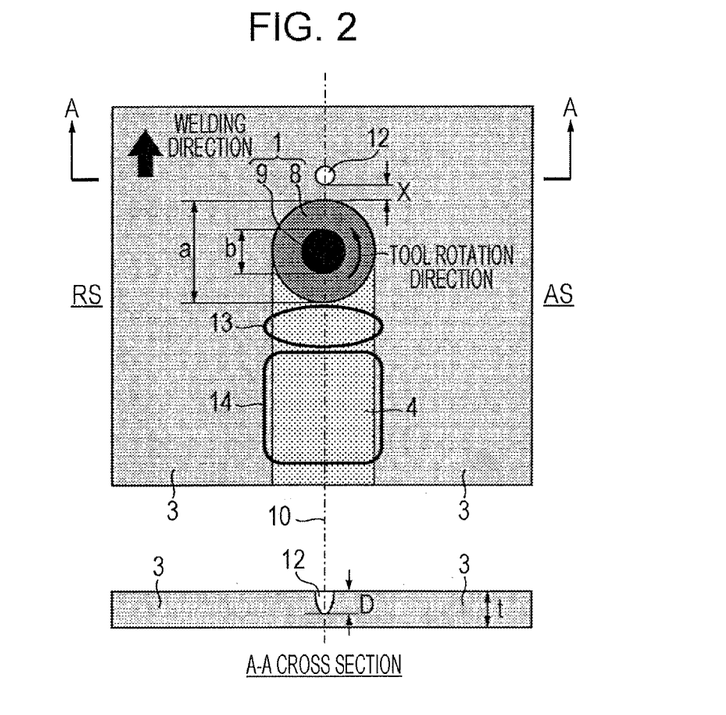
FIG. 2 illustrates views (top view and A-A cross-sectional view) of an example of a friction stir region of workpieces by rotary tools on both one surface side and the other surface side, a heated region by preheating process, and a cooled region and a reheated region after welding.

In the drawing, reference sign 10 denotes a welding centerline. The welding centerline is a straight line passing through the rotation axis of the rotary tool and being parallel to the welding direction on the surface of the steel sheet. Reference sign 12 denotes a heated region, 13 denotes a cooled region, 14 denotes a reheated (rear heated) region, a denotes the diameter of the shoulder of the rotary tool, b denotes the maximum diameter of the pin of the rotary tool, X denotes the minimum distance between the heated region and the rotary tool, D denotes the depth of the heated region, and t denotes the thickness of the steel sheet.

[Surface Temperature $T_S$ of Steel Sheet in Heated Region: $T_S \geq 0.8 \times T_A$]

Figure 3:
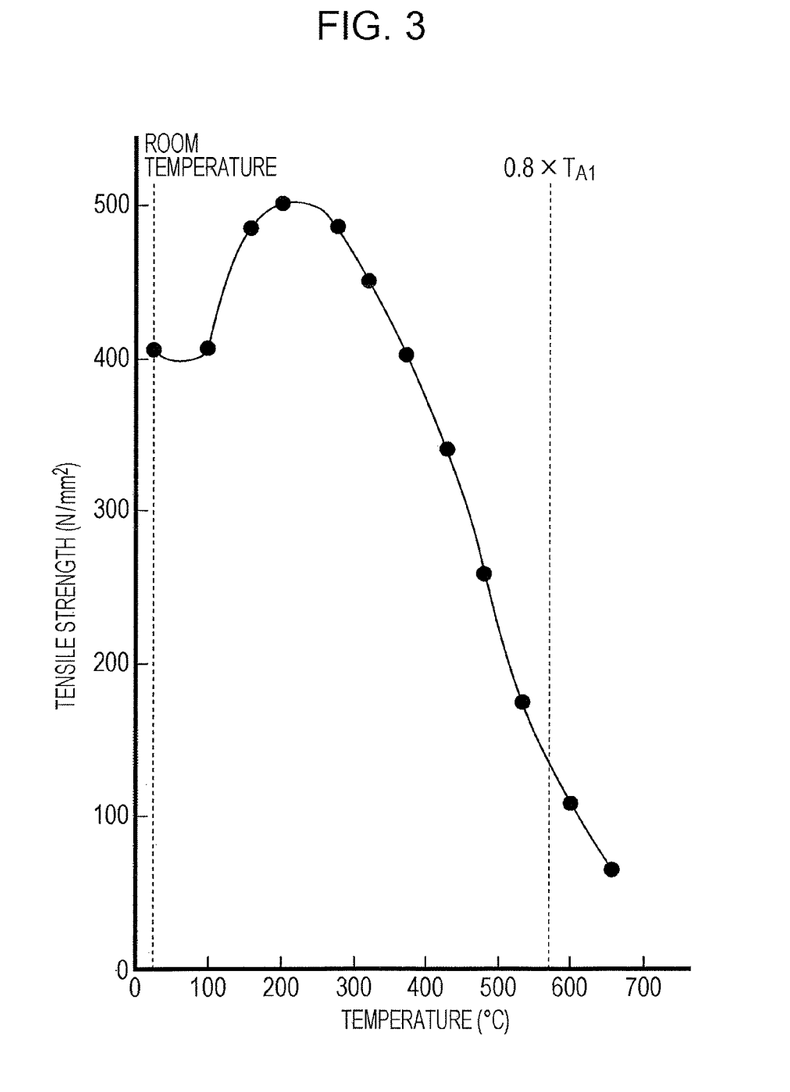
FIG. 3 illustrates the relationship between the temperature and the tensile strength of an example of structural steels to be used for the friction stir welding method according to aspects of the present invention.

FIG. 3 illustrates the relationship between the temperature and the tensile strength of the steel sheet to be welded by the friction stir welding method and apparatus according to aspects of the present invention. As illustrated in FIG. 3, the steel sheet normally has a strength of about 30% of room-temperature strength at a temperature of about 80% of $T_{A1}$ (ferrite-austenite transformation temperature), which is the transformation temperature of steel. As the temperature is higher than about 80% of $T_{A1}$, the steel sheet has lower strength. For this, the steel sheet is softened in advance by increasing the surface temperature of the steel sheet to $0.8 \times T_{A1}$° C. or higher, and the softened portion of the steel sheet is stirred to accelerate plastic flow, which reduces the load on the rotary tool and increases the welding speed. Therefore, in accordance with aspects of the present invention, the surface temperature $T_S$(° C.) of the steel sheet in the heated region is set to $0.8 \times T_{A1}$° C. or higher. The temperature $T_{A1}$(° C.) can be obtained from Formula (1) below.

$$T_{A1}(° C.)=723-10.7[\% Mn]-16.9[\% Ni]+29.1[\% Si]+16.9[\% Cr]+290[\% As]+6.38[\% W] \qquad (1),$$

where [% M] represents a content (mass %) of an M element in the steel sheet used as a workpiece. If the M element is not contained, [% M] is 0.

To ensure the heated region in the thickness direction, the surface of the heated region may have a temperature gradient. In this case, the surface temperature of the steel sheet in the heated region is preferably $1.5 \times T_M$° C. or lower. To avoid damage to the rotary tool and alterations in microstructure due to an excessive increase in the temperature of the welded part, the surface temperature of the steel sheet in the heated region is preferably lower than $T_M$° C. until the heated region contacts the rotary tool passing through the heated region.

The temperature $T_M$(° C.) is a melting point of the steel sheet used as a workpieces.

[Minimum Distance Between Rotary Tool on One Surface Side and Heated Region on Surface of Steel Sheet: Equal to or Smaller than Diameter of Shoulder of Rotary Tool]

If the distance between the rotary tool and the heated region on the surface of the steel sheet is too large, the temperature of the heated region decreases before welding, which hinders obtaining a sufficient preheating effect. Thus, the minimum distance between the heated region on the surface of the steel sheet and the rotary tool that moves in the welding direction is set to a distance equal to or smaller than the diameter of the shoulder of the rotary tool.

If the distance between the heated region and the rotary tool is too small, the rotary tool may be damaged by the heat from the heating means. Thus, the minimum distance between the heated region on the surface of the steel sheet and the rotary tool that moves in the welding direction is preferably set to 0.1 times or more of the diameter of the shoulder of the rotary tool. In this case, the moving speed of the rotary tool is preferably in a range from 200 mm/min to 3000 mm/min.

The diameter of the shoulder of the rotary tool is about 8 to 60 mm.

[Area of Heated Region on Surface of Steel Sheet: Equal to or Smaller than Area of Maximum Diameter Part of Pin of Rotary Tool on One Surface Side]

If the heated region is too large, the microstructures of the heated region and the surrounding region change. In particular, in the case of high-tensile steel sheet reinforced by the martensite structure, heating at the ferrite-austenite transformation temperature or lower still tempers martensite to cause softening and thus significantly reduces the welded part strength. For this, the area of the heated region on the surface of the steel sheet is set to an area equal to or smaller than the area of the maximum diameter part of the pin of the rotary tool.

If the area of the heated region is too small, a sufficient preheating effect is not obtained. Thus, the area of the heated region on the surface of the steel sheet is preferably 0.1 times or more of the area of the maximum diameter part in the pin of the rotary tool.

The maximum diameter of the pin (pin diameter) of the rotary tool is about 2 to 50 mm. The maximum diameter of the pin of the rotary tool is the largest diameter among diameters that are obtained at cross sections when a single pin is cut at cross sections (a plurality of times) perpendicular to the axial direction. For example, as illustrated in FIGS. 4(1) to 4(4), if the diameter of the pin does not change along the axial direction, the diameter of the upper surface of the pin (in the drawing, 4 mm) can be considered as the maximum diameter of the pin. If the pin has a tapered shape or the like and the diameter of the pin varies depending on the position in the axial direction, the largest diameter among diameters that are obtained at a plurality of cross sections can be considered as the maximum diameter.

The shape of the heated region can be any shape, such as a circular shape, an ellipsoidal shape, or a quadrangular shape. When the area of the heated region is calculated, if the shape of the heated region is an ellipsoidal shape, the major axis thereof can be employed as the pin diameter, and if the shape is a quadrangular shape or the like, the diameter of the equivalent circle can be employed as the pin diameter.

[Temperature $T_D$ of Region in Thickness Direction of Heated Region: $T_D \geq 0.8 \times T_{A1}$]

As described above, the steel sheet to be welded with the friction stir welding method and apparatus according to aspects of the present invention normally has a strength of about 30% of room-temperature strength at a temperature of about 80% of $T_{A1}$, which is the transformation temperature of steel. As the temperature is higher than about 80% of $T_{A1}$, the steel sheet has lower strength. Hence, it is preferable to increase the temperature of the steel sheet not only at the surface of the steel sheet but also in the thickness direction and soften the steel sheet in advance. To be specific, the steel sheet is preferably softened in advance by keeping the temperature at $0.8 \times T_{A1}$° C. or higher even in the thickness direction of the heated region. Thus, stirring and plastic flow of the steel sheet are promoted, the load on the rotary tool can be further decreased, and the welding speed can be further increased. Accordingly, the temperature $T_D$ of the heated region in the thickness direction, which defines the depth D of the heated region described below, is set to $0.8 \times T_{A1}$° C. or higher. The temperature $T_{A1}$(° C.) can be obtained from Formula (1) below.

$$T_{A1}(° C.)=723-10.7[\% Mn]-16.9[\% Ni]+29.1[\% Si]+16.9[\% Cr]+290[\% As]+6.38[\% W] \qquad (1),$$

where [% M] represents a content (mass %) of an M element in the steel sheet used as a workpiece. If the M element is not contained, [% M] is 0.

To ensure the increased temperature region in the thickness direction, the heated region may have a temperature gradient in the thickness direction. In this case, the temperature of the steel sheet in the heated region in the thickness direction is preferably $1.5 \times T_M$° C. or lower during heating with the heating means. To avoid damage to the rotary tool and changes in microstructure due to an excessive increase in the temperature of the welded part, the temperature of the steel sheet in the heated region in the thickness direction is preferably lower than $T_M$° C. until the heated region contacts the rotary tool passing through the heated region.

The temperature $T_M$(° C.) is a melting point of the steel sheet used as a workpiece.

[Depth D of Heated Region: 100% of Thickness of Steel Sheet]

The depth D of the heated region is defined as the maximum depth of a region that has a temperature $T_D$ of $0.8 \times T_{A1}$° C. or higher in the heated region in the thickness direction and that extends from the surface of the steel sheet used as a workpiece. The depth D of the heated region is preferably 100% of the thickness of the steel sheet. This is because plastic flow is maximally accelerated by setting the depth D of this heated region to 100% of the thickness of the steel sheet, which is advantageous in reducing the load on the rotary tool and increasing the welding speed. In the conventional technology of pressing the rotary tool on the same surface side as the heating means of the preheating process and performing welding, the side opposite to the side which is provided with the heating means of the preheating process and on which the rotary tool is pressed is required to be supported by a support body having a hardness equal to or higher than that of the steel sheet. In contrast, by setting the depth D to 100% of the thickness of the steel sheet, the support by the support body is not required. If the depth D of the heated region exceeds 30% of the thickness of the steel sheet, the workpiece and the support body may be adhered. However, according to aspects of the present invention, since the support body is not provided on the side opposite to the side of the heated region, adherence does not occur even when the depth D of the heated region is 100% of the thickness of the steel sheet.

Control means for controlling operating conditions of the apparatus may also be used so that the position and area of the heated region satisfy the above-described conditions (condition 1) or the depth D of the heated region satisfies the above-described conditions (condition 2). To be specific, the control means can control the operating conditions of the heating means and the rotary tools. In addition, the control means can also control the operations of, for example, rear heating means, cooling means, and rear reheating means (described later).

[Material of Surface of Rotary Tool: Kinetic Friction Coefficient with Respect to Steel Sheet being Larger than 0.6]

In friction stir welding of the steel sheet, plastic flow on the front surface side starts from the advancing side, moves along the rotation direction of the rotary tool, passes sequentially through the front side in the welding direction, through the retreating side, and through the rear side in the welding direction, and ends on the advancing side. In particular, to increase the welding speed and working efficiency, it is important to generate sufficient frictional heat and to accelerate plastic flow on the advancing side and the front side in the welding direction close to the start point of plastic flow. In this viewpoint, the material forming the surface of the rotary tool preferably has a kinetic friction coefficient with respect to the steel sheet being larger than 0.6. The rotary tool may be formed of a material whose kinetic friction coefficient with respect to the steel sheet is larger than 0.6, or the surface of the rotary tool may be coated with a material whose kinetic friction coefficient with respect to the steel sheet is larger than 0.6. The material is only required to be formed on at least a surface of the rotary tool, the surface which contacts the steel sheet during friction stirring. The material whose kinetic friction coefficient with respect to the steel sheet is larger than 0.6 may be, for example, tungsten carbide (WC). The method for measuring the kinetic friction coefficient is not limited to a particular method, but may use, for example, a ball-on-disk method.

The heating means used in the preheating process is not limited to a particular device, but a laser heating device is preferably used.

This is because using a laser with high energy density as a heat source as in a laser heating device enables more accurate control of the conditions of the preheating process and improves welding workability without impairing welded part properties.

The conditions other than the above-described conditions are not limited and, for example, the moving speed of the heating means used in the preheating process is set to substantially the same as the welding speed. When a laser heating device is used as the heating means, the laser output, the beam diameter, and so forth are set appropriately according to the welding conditions.

In the friction stir welding method and apparatus according to aspects of the present invention, cooling means is provided behind the rotary tool that moves in the welding direction, and the cooling means can improve the welded part strength.

The welded part is normally cooled naturally after completion of welding, and thus there has been a problem in that sufficient welded part strength is not obtained when steel used as a workpiece has low hardenability. Regarding this, fortunately, the cooling means provided behind the rotary tool that moves in the welding direction can cool the welded part of the steel sheet, and appropriate control of the cooling rate allows the strength to be improved by quench hardening. Specific cooling means is preferably cooling means using jet spraying of inert gas. The cooling rate in this case is preferably, for example, 30° C./s to 300° C./s in the range of 800° C. to 500° C. The inert gas may be, for example, argon gas, helium gas, or other gas.

On the other hand, when steel used as a workpiece has high hardenability, there has been a problem in that the welded part may be excessively hardened to reduce the toughness of the weld joint. Regarding this, fortunately, excessive hardening can be suppressed by placing rear heating means for heating the rear part close to the rotary tool and by appropriately controlling the cooling rate to slowly cool the steel sheets. Specific rear heating means is preferably heating means using high-frequency induction heating or using a laser as a heat source. The slow cooling rate is preferably, for example, 10° C./s to 30° C./s in the range of 800° C. to 500° C.

Rear reheating means may be provided behind the rotary tool that moves in the welding direction and behind the cooling means described above. The rear reheating means may reheat the welded part of the steel sheets.

If the welded part is quench-hardened by cooling with the cooling means and excessively hardened, the hardness can be reduced by tempering the welded part with the rear reheating means to obtain good joint properties, namely, both high strength and toughness. The cooling rate by the cooling means in this case is preferably, for example, 30° C./s to 300° C./s in the range of 800° C. to 500° C. The temperature of the welded part after the reheating is preferably, for example, from 550° C. to 650° C.

Cooling means may be provided behind the rotary tool that moves in the welding direction and behind the rear reheating means described above; thereby the welded part of the steel sheets be cooled.

In this case, a composite microstructure can be formed by, just after welding, reducing the cooling rate with the rear reheating means and then increasing the cooling rate with the cooling means, which provides good joint properties, namely, both high strength and high ductility. For example, the cooling rate by the reheating means in this case is preferably about 10° C./s to 30° C./s in the range of 800° C. to 600° C., and then the cooling rate by the cooling means is preferably about 30° C./s to 300° C./s in the range of 600° C. to 400° C.

The welding conditions other than the above-described conditions are set according to an ordinary method. A larger torque of the rotary tool means lower plastic flowability of the steel sheets and results in higher tendency to generate defects or the like.

Therefore, in accordance with aspects of the present invention, attempts are preferably made to regulate the torque of the rotary tool by controlling the rotation speed of the rotary tool in the range of 100 to 1000 rpm and to increase the welding speed to 1000 mm/min or higher.

As the type of steel targeted in accordance with aspects of the present invention, general structural steel or carbon steel, such as rolled steel for weld structure of JIS (Japan Industrial Standards) G 3106 or carbon steel for machine structure of JIS G 4051, can be suitably used. Aspects of the present invention can also be advantageously applied to high-strength structural steel having tensile strength of 800 MPa or higher. In this case also, the strength of the welded part is equal to or higher than 85% of the tensile strength of the steel sheet (base material) or even equal to or higher than 90% of the tensile strength of the steel sheet (base material).

EXAMPLES

Friction stir welding was performed using steel sheets (steel sheets 1 together or steel sheets 2 together) having a sheet thickness of 1.60 mm and having the chemical compositions (residual parts other than the compositions in Table 1 are composed of Fe and unavoidable impurities) and the tensile strengths shown in Table 1. The joint abutting faces, which formed a non-angled, so called I-shaped, groove while the surface conditions were similar to those after milling, were subjected to welding while pressing the rotary tool(s) from one surface side or from both the one surface side and the other surface side of steel sheets. The welding conditions for friction stir welding are shown in Table 2 (and Table 5). Conditions L4 and H3 are welding conditions when welding was performed while a rotary tool was pressed from the one surface side of the steel sheets (comparative examples). Conditions L1, L2, L3, H1, and H2 are welding conditions when welding was performed while rotary tools were pressed from both the one surface side and the other surface side (examples of the present invention, or referred to as invention examples) of the steel sheets. A rotary tool made of tungsten carbide (WC) and having one of four shapes with the cross-sectional dimensions shown in FIGS. 4(1), 4(2), 4(3), and 4(4) was used. During welding, oxidation of the surface was prevented by shielding the welded part with argon gas.

For a material of the surface of the rotary tool, one using tungsten carbide (WC) as a base material and not coated (Invention Examples 1 to 24 and Comparative Examples 1 to 7) or one using tungsten carbide as a base material and coated with titanium nitride (TiN) by physical vapor deposition (PVD) (WC+TiN) (Invention Examples 25 to 27) was used. The friction coefficient between the surface of the rotary tool and the steel sheet was 0.7 in the case without coating on WC, and 0.5 in the case with TiN coating. When the kinetic friction coefficient was measured, a ball-on-disk friction and wear testing machine was used, a disk made of the subject material was pressed to a fixed steel ball having a diameter of 6 mm by a load of 5 N while rotated, and a test was performed with a rotation speed of 100 mm/s and a slide distance of 300 m. The test was performed at room temperatures without lubrication. The steel ball made of a material having a chemical composition of SUJ2 determined in JIS G 4805 and processed as a steel ball for bearing was used.

TABLE 1

| No. | Chemical Composition (mass %) | | | | | Tensile Strength (MPa) | $0.8 \times T_{A1}$ (° C.) |
| --- | --- | --- | --- | --- | --- | --- | --- |
| | C | Si | Mn | P | S | | |
| 1 | 0.3 | 0.21 | 0.69 | 0.012 | 0.003 | 1015 | 577 |
| 2 | 0.16 | 0.07 | 0.69 | 0.016 | 0.009 | 420 | 574 |

TABLE 2

| Friction Stir Welding Conditions (Main Welding) | Position of Tool | Shape of Tool | Clearance between Distal Ends of Pins δ (mm) | Tilt Angle (°) of Tool | Rotation Direction of Tool (Direction Viewed from Front Surface Side) | Rotation Speed (rpm) of Tool | Welding Speed (mm/min) |
| --- | --- | --- | --- | --- | --- | --- | --- |
| L1 | front surface side | pin length: 0.7 mm | 0.1 | 3 | clockwise | 400 | 400 |
| | back surface side | pin length: 0.7 mm | | 3 | counterclockwise | 400 | |
| L2 | front surface side | pin length: 0.2 mm | 0.2 | 3 | clockwise | 400 | 400 |
| | back surface side | pin length: 1.2 mm | | 3 | counterclockwise | 400 | |
| L3 | front surface side | pin length: 1.2 mm | 0.3 | 3 | clockwise | 400 | 400 |
| | back surface side | pin length: 0.2 mm | | 3 | clockwise | 400 | |
| L4 | front surface side | pin length: 1.4 mm | — | 3 | clockwise | 400 | 400 |
| | back surface side | — | | — | — | — | |
| H1 | front surface side | pin length: 0.7 mm | 0.2 | 3 | clockwise | 600 | 1000 |
| | back surface side | pin length: 0.7 mm | | 3 | counterclockwise | 600 | |
| H2 | front surface side | pin length: 0.2 mm | 0.3 | 3 | clockwise | 600 | 1000 |
| | back surface side | pin length: 1.2 mm | | 3 | counterclockwise | 600 | |
| H3 | front surface side | pin length: 1.4 mm | — | 3 | clockwise | 600 | 1000 |
| | back surface side | — | | — | — | — | |

Before welding was performed, in order to determine the heating region heated by preheating using a laser as a heat source, the steel sheet 1 shown in Table 1 was irradiated with a laser beam under different irradiation conditions (laser moving speed, laser output, and beam diameter) shown in Table 3, and the surface temperature was measured by thermography. Microstructure observation using a Nital etching solution was carried out by observing the cross section of the laser-irradiated part.

The region having temperatures equal to or higher than the transformation temperature ($T_{A1}$° C.) was etched most deeply, and its surrounding region where the temperature was lower than the transformation temperature ($T_{A1}$° C.) but the structure with high hardness such as martensite in the base material was tempered was etched relatively shallowly. The region having experienced temperatures equal to or higher than the transformation temperature ($T_A1$° C.), the region tempered at temperatures lower than the transformation temperature ($T_{A1}$° C.), and the base-material region can be distinguished from each other. On the basis of the knowledge about steel heat treatment, it is known that the region tempered at temperatures lower than the transformation temperature ($T_{A1}$° C.) corresponds to the region having temperatures of $0.8 \times T_{A1}$° C. or higher and lower than $T_{A1}$° C. The depth Do of the region having experienced temperatures equal to or higher than the transformation temperature ($T_{A1}$° C.) and the depth of the region having experienced temperatures equal to or higher than $0.8 \times T_{A1}$° C. (the depth D of the heated region) were determined by such microstructure observation using a Nital etching solution.

The measurement results are shown in Table 4.

TABLE 3

| Irradiation Conditions | Moving Speed (mm/min) | Laser Output (kW) | Beam Diameter (mm) |
| --- | --- | --- | --- |
| A | 400 | 4.0 | 1.8 |
| B | 400 | 1.4 | 1.8 |
| C | 400 | 4.0 | 5.0 |
| D | 1000 | 4.0 | 1.0 |
| E | 1000 | 4.0 | 1.8 |

TABLE 4

| Irradiation Conditions | Shape of Heated Region | Major Axis (mm) of Heated Region on Surface of Steel Sheet | Minor Axis (mm) of Heated Region on Surface of Steel Sheet | $D_0$ (mm) | Depth D (mm) of Heated Region |
| --- | --- | --- | --- | --- | --- |
| A | circle | 2.4 | — | 1.60 | 1.60 |
| B | circle | 2.0 | — | 0.47 | 0.50 |
| C | circle | 5.4 | — | 0.28 | 0.30 |
| D | ellipse | 1.8 | 1.2 | 1.60 | 1.60 |
| E | ellipse | 2.3 | 1.9 | 0.58 | 0.63 |

As shown in Table 4, the measurement results of the surface temperature by thermography indicate that, under the irradiation condition A, the region having temperatures equal to or higher than $0.8 \times T_{A1}$° C. had a circular shape with a diameter of 2.4 mm. Since the maximum diameter of the pin of the rotary tool used here is 4.0 mm, the area of the heated region on the surface of the steel sheet is equal to or smaller than the area of the maximum diameter part of the pin of the rotary tool.

Under the irradiation condition B, the region having temperatures equal to or higher than $0.8 \times T_{A1}$° C. had a circular shape with a diameter of 2.0 mm. Therefore, the area of the heated region on the surface of the steel sheet is equal to or smaller than the area of the maximum diameter part of the pin of the rotary tool similarly as described above.

Under the irradiation condition C, the region having temperatures equal to or higher than $0.8 \times T_{A1}$° C. had a circular shape with a diameter of 5.4 mm. Since the maximum diameter of the pin of the rotary tool used here is 4.0 mm, the area of the heated region on the surface of the steel sheet is larger than the area of the maximum diameter part of the pin of the rotary tool. In any of the irradiation conditions A to C, the heated region had a circular shape, and hence the minor axis thereof is not described in Table 4.

Under the irradiation condition D, the region having temperatures equal to or higher than $0.8 \times T_{A1}$° C. had an ellipsoidal shape with a major diameter of 1.8 mm in the laser moving direction, and a minor diameter of 1.2 mm in the direction perpendicular to the laser moving direction. Since the maximum diameter of the pin of the rotary tool used here is 4.0 mm, the area of the heated region on the surface of the steel sheet is equal to or smaller than the area of the maximum diameter part of the pin of the rotary tool.

Under the irradiation condition E, the region having temperatures equal to or higher than $0.8 \times T_{A1}$° C. had an ellipsoidal shape with a major diameter of 2.3 mm in the laser moving direction, and a minor diameter of 1.9 mm in the direction perpendicular to the laser moving direction. Therefore, the area of the heated region on the surface of the steel sheet is equal to or smaller than the area of the maximum diameter part of the pin of the rotary tool similarly as described above.

As shown in Table 4, observation of the cross section of the laser-irradiated part indicates that, under the irradiation condition A, the depth $D_0$ of the region having experienced temperatures equal to or higher than $T_{A1}$° C. and the depth of the region having experienced temperatures equal to or higher than $0.8 \times T_{A1}$° C. (the depth D of the heated region) were 1.60 mm and 1.60 mm, respectively. The region having experienced temperatures equal to or higher than $T_{A1}$° C. was formed in the entire thickness of the steel sheet. Therefore, the depth D of the region having experienced temperatures equal to or higher than $0.8 \times T_{A1}$° C. is 100% of the thickness t of the steel sheet.

Under the irradiation condition B, the depth $D_0$ of the region having experienced temperatures equal to or higher than $T_{A1}$° C. and the depth of the region having experienced temperatures equal to or higher than $0.8 \times T_{A1}$° C. (the depth D of the heated region) were 0.47 mm and 0.50 mm, respectively. Since the thickness t of the steel sheet used as a workpiece is 1.60 mm, the depth D of the heated region is about 31.3% of the thickness t of the steel sheet.

Under the irradiation condition C, the depth $D_0$ of the region having experienced temperatures equal to or higher than $T_{A1}$° C. and the depth of the region having experienced temperatures equal to or higher than $0.8 \times T_{A1}$° C. (the depth D of the heated region) were 0.28 mm and 0.30 mm, respectively. Since the thickness t of the steel sheet used as a workpiece is 1.60 mm, the depth D of the heated region is about 18.8% of the thickness t of the steel sheet.

Under the irradiation condition D, the depth Do of the region having experienced temperatures equal to or higher than $T_{A1}$° C. and the depth of the region having experienced temperatures equal to or higher than $0.8 \times T_{A1}$° C. (the depth D of the heated region) were 1.60 mm and 1.60 mm, respectively. The region having temperatures equal to or higher than $T_{A1}$° C. was formed in the entire thickness of the steel sheet. Therefore, the depth D of the region having experienced temperatures equal to or higher than $0.8 \times T_{A1}°$ C. is 100% of the thickness t of the steel sheet.

Under the irradiation condition E, the depth Do of the region having experienced temperatures equal to or higher than $T_{A1}°$ C. and the depth of the region having experienced temperatures equal to or higher than $0.8 \times T_{A1}°$ C. (the depth D of the heated region) were 0.58 mm and 0.63 mm, respectively. Since the thickness t of the steel sheet used as a workpiece is 1.60 mm, the depth D of the heated region is about 39.4% of the thickness t of the steel sheet.

Table 5 shows the conditions of the preheating process by laser irradiation before welding of the workpieces and the conditions of the process after welding. In the process after welding, cooling was performed by gas jet spraying and heating (and reheating) was performed by induction heating.

The sign "-" in the conditions of the preheating process and the conditions of the process after welding in Table 5 indicates that the heating before stir welding, or such as cooling and/or heating after stir welding was not carried out.

TABLE 5

| | Sample Steel Sheet | Tool | Friction Stir Welding Conditions (Main Welding) | Conditions of Preheating Process | | Conditions of Process after Welding | | |
|---|---|---|---|---|---|---|---|---|
| | | | | Laser Irradiation Conditions | Distance X (mm) between Heated Region and Rotary Tool | Additional Process | Cooling (Slow Cooling) Rate (° C./s) | Reheating Temperature (° C.) |
| Invention Example 1 | 1 | WC | L1 | A | 6 | — | — | — |
| Invention Example 2 | 1 | WC | L1 | A | 10 | — | — | — |
| Invention Example 3 | 1 | WC | L1 | B | 3 | — | — | — |
| Invention Example 4 | 1 | WC | L2 | A | 8 | — | — | — |
| Invention Example 5 | 1 | WC | L2 | B | 3 | — | — | — |
| Invention Example 6 | 1 | WC | L3 | B | 2 | — | — | — |
| Invention Example 7 | 1 | WC | L1 | A | 6 | cooling → reheating | 265*1 | 600 |
| Invention Example 8 | 2 | WC | L1 | A | 10 | cooling → reheating | 265*1 | 600 |
| Invention Example 9 | 1 | WC | L1 | B | 3 | only cooling | 100*1 | — |
| Invention Example 10 | 2 | WC | L2 | A | 8 | only heating | 10*1 | — |
| Invention Example 11 | 1 | WC | L2 | B | 3 | heating → cooling | 10*2 → 100*3 | — |
| Invention Example 12 | 1 | WC | H1 | D | 6 | — | — | — |
| Invention Example 13 | 1 | WC | H1 | D | 10 | — | — | — |
| Invention Example 14 | 1 | WC | H1 | E | 2 | — | — | — |
| Invention Example 15 | 1 | WC | H2 | D | 8 | — | — | — |
| Invention Example 16 | 1 | WC | H2 | E | 2 | — | — | — |
| Invention Example 17 | 1 | WC | H1 | D | 6 | cooling → reheating | 265*1 | 600 |
| Invention Example 18 | 2 | WC | H1 | D | 10 | cooling → reheating | 265*1 | 600 |
| Invention Example 19 | 1 | WC | H1 | E | 2 | only cooling | 100*1 | — |
| Invention Example 20 | 2 | WC | H2 | D | 8 | only heating | 10*1 | — |
| Invention Example 21 | 1 | WC | H2 | E | 2 | heating → cooling | 10*2 → 100*3 | — |
| Invention Example 22 | 1 | WC | H1 | D | 6 | — | — | — |
| Invention Example 23 | 1 | WC | H1 | D | 10 | — | — | — |
| Invention Example 24 | 1 | WC | H1 | E | 2 | — | — | — |
| Invention Example 25 | 1 | WC + TiN | H1 | D | 6 | — | — | — |
| Invention Example 26 | 1 | WC + TiN | H1 | D | 10 | — | — | — |
| Invention Example 27 | 1 | WC + TiN | H1 | E | 2 | — | — | — |
| Comparative Example 1 | 1 | WC | L1 | — | — | — | — | — |
| Comparative Example 2 | 1 | WC | L1 | B | 13 | — | — | — |
| Comparative Example 3 | 1 | WC | L1 | C | 8 | — | — | — |

TABLE 5-continued

| | Sample Steel Sheet | Tool | Friction Stir Welding Conditions (Main Welding) | Conditions of Preheating Process | | Conditions of Process after Welding | | |
| --- | --- | --- | --- | --- | --- | --- | --- | --- |
| | | | | Laser Irradiation Conditions | Distance X (mm) between Heated Region and Rotary Tool | Additional Process | Cooling (Slow Cooling) Rate (° C./s) | Reheating Temperature (° C.) |
| Comparative Example 4 | 1 | WC | L4 | B | 8 | — | — | — |
| Comparative Example 5 | 1 | WC | H1 | — | — | — | — | — |
| Comparative Example 6 | 1 | WC | H1 | D | 13 | — | — | — |
| Comparative Example 7 | 1 | WC | H3 | E | 11 | — | — | — |

*[1]cooling rate from 800° C. to 650° C. *[2]cooling rate from 800° C. to 600° C. *[3]cooling rate from 600° C. to 400° C.

Table 6 shows the measurement values of the torque of the rotary tool during welding and the tensile strength of the obtained weld joint. The tensile strength was determined by performing tensile testing on tensile test specimens that were taken from the obtained weld joint and had the size of specimen no. 1 defined in JIS Z 3121.

A larger torque of the rotary tool means lower plastic flowability and results in higher tendency to generate defects or the like.

8 involving cooling and reheating after welding exhibited a strength corresponding to 99% or higher of the tensile strength of the base material.

Comparative Examples 1 to 3 were performed under the friction stir welding conditions for welding by pressing the rotary tools from both the one surface side and the other surface side of the steel sheet satisfying the ranges according to aspects of the present invention, the welding speed was 400 mm/min, and the conditions for preheating process did

TABLE 6

| | Torque (N · m) of Front Surface Side Rotary Tool | Torque (N · m) of Back Surface Side Rotary Tool | Tensile Strength (MPa) | Tensile Strength of Joint/Tensile Strength of Base Material (%) |
| --- | --- | --- | --- | --- |
| Invention Example 1 | 60 | 62 | 915 | 90 |
| Invention Example 2 | 66 | 70 | 913 | 90 |
| Invention Example 3 | 70 | 78 | 918 | 90 |
| Invention Example 4 | 65 | 65 | 916 | 90 |
| Invention Example 5 | 68 | 79 | 921 | 91 |
| Invention Example 6 | 79 | 75 | 916 | 90 |
| Invention Example 7 | 61 | 61 | 1015 | 100 |
| Invention Example 8 | 67 | 71 | 419 | 100 |
| Invention Example 9 | 72 | 79 | 1017 | 100 |
| Invention Example 10 | 63 | 65 | 417 | 99 |
| Invention Example 11 | 67 | 80 | 980 | 97 |
| Invention Example 12 | 83 | 84 | 947 | 93 |
| Invention Example 13 | 91 | 94 | 950 | 94 |
| Invention Example 14 | 95 | 99 | 949 | 93 |
| Invention Example 15 | 87 | 90 | 948 | 93 |
| Invention Example 16 | 93 | 100 | 951 | 94 |
| Invention Example 17 | 82 | 84 | 1016 | 100 |
| Invention Example 18 | 92 | 95 | 421 | 100 |
| Invention Example 19 | 96 | 98 | 1015 | 100 |
| Invention Example 20 | 87 | 90 | 415 | 99 |
| Invention Example 21 | 93 | 99 | 1008 | 99 |
| Invention Example 22 | 83 | 85 | 944 | 93 |
| Invention Example 23 | 91 | 95 | 951 | 94 |
| Invention Example 24 | 94 | 94 | 950 | 94 |
| Invention Example 25 | 75 | 76 | 807 | 80 |
| Invention Example 26 | 78 | 76 | 847 | 83 |
| Invention Example 27 | 79 | 78 | 861 | 85 |
| Comparative Example 1 | 93 | 92 | 917 | 90 |
| Comparative Example 2 | 91 | 91 | 913 | 90 |
| Comparative Example 3 | 81 | 95 | 915 | 90 |
| Comparative Example 4 | 105 | — | 917 | 90 |
| Comparative Example 5 | — | — | — | — |
| Comparative Example 6 | — | — | — | — |
| Comparative Example 7 | — | — | — | — |

Table 6 shows that, in Invention Examples 1 to 11, a welding speed of 400 mm/min still resulted in a strength corresponding to 85% or higher of the tensile strength of the steel sheet used as a base material as well as a torque of the rotary tool on each of the front surface side and the back surface side of 80 N·m or smaller, which indicates good plastic flowability. In particular, Invention Examples 7 and not satisfy the ranges according to aspects of the present invention. In Comparative Examples 1 to 3, the torque of the rotary tool on each of the front surface side and the back surface side was larger than 80 N·m, which indicates poor plastic flowability. Comparative Example 4 was performed under the friction stir welding conditions for welding by pressing the rotary tool from only the one surface side of the steel sheets not satisfying the ranges according to aspects of the present invention, and the conditions for preheating process satisfied the ranges according to aspects of the present invention. But the torque of the rotary tool on the front surface side was larger than 80 N·m, which indicates poor plastic flowability.

Table 6 shows that, in Invention Examples 12 to 21, a high welding speed of 1000 mm/min still resulted in welding with a strength corresponding to 85% or higher of the tensile strength of the steel sheet used as a base material as well as a torque of the rotary tool on each of the front surface side and the back surface side of 100 N·m or smaller, providing a sound joint. In particular, Invention Examples 17 and 18 involving cooling and reheating after welding exhibited a strength corresponding to 100% of the tensile strength of the base material.

Comparative Examples 5 and 6 were performed under the friction stir welding conditions for welding by pressing the rotary tools from both the one surface side and the other surface side of the steel sheets satisfying the ranges according to aspects of the present invention and the conditions for preheating process did not satisfy the ranges according to aspects of the present invention. Comparative Example 7 was performed under the friction stir welding conditions for welding by pressing the rotary tool from only the one surface side of the steel sheet not satisfying the ranges according to aspects of the present invention and the conditions for preheating process satisfy the ranges according to aspects of the present invention. In Comparative Examples 5 to 7, a non-welded part remained, welding was not performed, and a sound joint was not obtained. Therefore, the measurements on the torque and so force of the rotary tools were not performed in Comparative Examples 5 to 7.

Table 6 shows that, in Invention Examples 22 to 24, a high welding speed of 1000 mm/min still resulted in normal welding with a torque on each of the front surface side and the back surface side of the rotary tool of 95 N·m or smaller. Invention Examples 22 to 24 exhibited a strength corresponding to 90% or more of the tensile strength of the steel sheet used as a base material. A sound joint was obtained. In Invention Examples 25 to 27 using a material with a kinetic friction coefficient with respect to the steel sheet of 0.6 or smaller, the torque of the rotary tool on each of the front surface side and the back surface side was 76 N·m or smaller. Invention Examples 25 to 27 exhibited a strength corresponding to 75% to 80% of the tensile strength of the steel sheet used as a base material, which indicates a poor joint compared to the sound joint in Invention Examples 22 to 24 experimented under the same conditions except for the kinetic friction coefficient.

REFERENCE SIGNS LIST 1 front-surface-side rotary tool
2 rotation axis of front-surface-side rotary tool
3 steel sheet
4 welded part
5 heating means
6 cooling means
7 rear reheating means
8 shoulder of front-surface-side rotary tool
9 pin of front-surface-side rotary tool
10 welding centerline
12 heated region
13 cooled region
14 reheated region
15 back-surface-side rotary tool
16 shoulder of back-surface-side rotary tool
17 pin of back-surface-side rotary tool
19 rotation axis of back-surface-side rotary tool
a diameter of shoulder of front-surface-side rotary tool
b maximum diameter of pin of front-surface-side rotary tool
c pin length of pin of front-surface-side rotary tool
X distance between heated region and rotary tool
D depth of heated region
t thickness of steel sheet
α tilt angle of front-surface-side rotary tool
β tilt angle of back-surface-side rotary tool

The invention claimed is:

1. A friction stir welding method for structural steel, the method welding steel sheets used as workpieces together by moving a rotary tool in a welding direction while rotating the rotary tool in a non-welded part of the steel sheets, and thus by producing plastic flow as a result of that the steel sheets are softened by frictional heat generated between the rotary tool and the steel sheets and that the softened portion is stirred with the rotary tool, the rotary tool including a shoulder and a pin disposed on the shoulder and sharing a rotation axis with the shoulder, at least the shoulder and the pin being made of a material harder than the steel sheets, the method comprising:

arranging the rotary tool on each of one surface side and the other surface side of the steel sheets so as to face one another;

holding the steel sheets using a holding device, causing each of the shoulders of the facing rotary tools to press the one surface side and the other surface side of the steel sheets, inserting each of the pins of the facing rotary tools into the non-welded part of the steel sheets from the one surface side and the other surface side, and moving the rotary tools in the welding direction while rotating the rotary tools; and heating at least one of the steel sheets using heating means provided in front of the rotary tool on the one surface side that moves in the welding direction, wherein, when a region of a surface of the steel sheet whose surface temperature $T_S$(° C.) is increased to $T_S \geq 0.8 \times T_{A1}$ ($T_{A1}$ is described in Formula (1) below)

by the heating is defined as a heated region, a minimum distance between the rotary tool and the heated region on the surface of the steel sheet is equal to or smaller than a diameter of the shoulder of the rotary tool, an area of the heated region on the surface of the steel sheet is equal to or smaller than an area of a maximum diameter part of the pin of the rotary tool, and wherein, when a depth of a region that extends from the surface of the steel sheet in the heated region in a thickness direction and has a temperature $T_D$(° C.) satisfying $T_D \geq 0.8 \times T_{A1}$ is defined as a depth D of the heated region, the depth D of the heated region is 100% of a thickness t of the steel sheet, $T_{A1}$(° C.)=723−10.7[% Mn]−16.9[% Ni]+29.1[% Si]+16.9[% Cr]+290[% As]+6.38[% W]     (1), where [% M] represents a content (mass %) of an M element in the steel sheet used as the workpiece, and if the M element is not contained, [% M] is 0, and wherein, for pin lengths of the pins of both the facing rotary tools, the pin length of the pin of the rotary tool on the one surface side is smaller than the pin length of the pin of the rotary tool on the other surface side.

2. The friction stir welding method for structural steel according to claim 1, wherein a rotation direction of the rotary tool on the one surface side is opposite to a rotation direction of the rotary tool on the other surface side.

3. The friction stir welding method for structural steel according to claim 1, further comprising providing rear heating means behind the rotary tool that moves in the welding direction, and heating a welded part of the steel sheets with the rear heating means.

4. The friction stir welding method for structural steel according to claim 3, further comprising providing cooling means behind the rotary tool and behind the rear heating means, and cooling the welded part of the steel sheets with the cooling means.

5. The friction stir welding method for structural steel according to claim 1, further comprising providing cooling means behind the rotary tool that moves in the welding direction, and cooling a welded part of the steel sheets with the cooling means.

6. The friction stir welding method for structural steel according to claim 4, further comprising providing rear reheating means behind the rotary tool that moves in the welding direction and behind the cooling means, and reheating the welded part of the steel sheets with the rear reheating means.

7. The friction stir welding method for structural steel according to claim 1, wherein surfaces of the rotary tools are formed of a material having a kinetic friction coefficient with respect to the steel sheets being larger than 0.6.

8. The friction stir welding method for structural steel according to claim 1, wherein the material of the shoulder and the pin consists of tungsten carbide as a base material coated with titanium nitride.

9. The friction stir welding method for structural steel according to claim 1, wherein a center of the heated region is on a welding centerline.

\* \* \* \* \*